Oct. 16, 1923.　　　　　　　　　　　　　　1,470,667
C. H. HAPGOOD
WEIGHING SCALE
Filed June 3, 1921
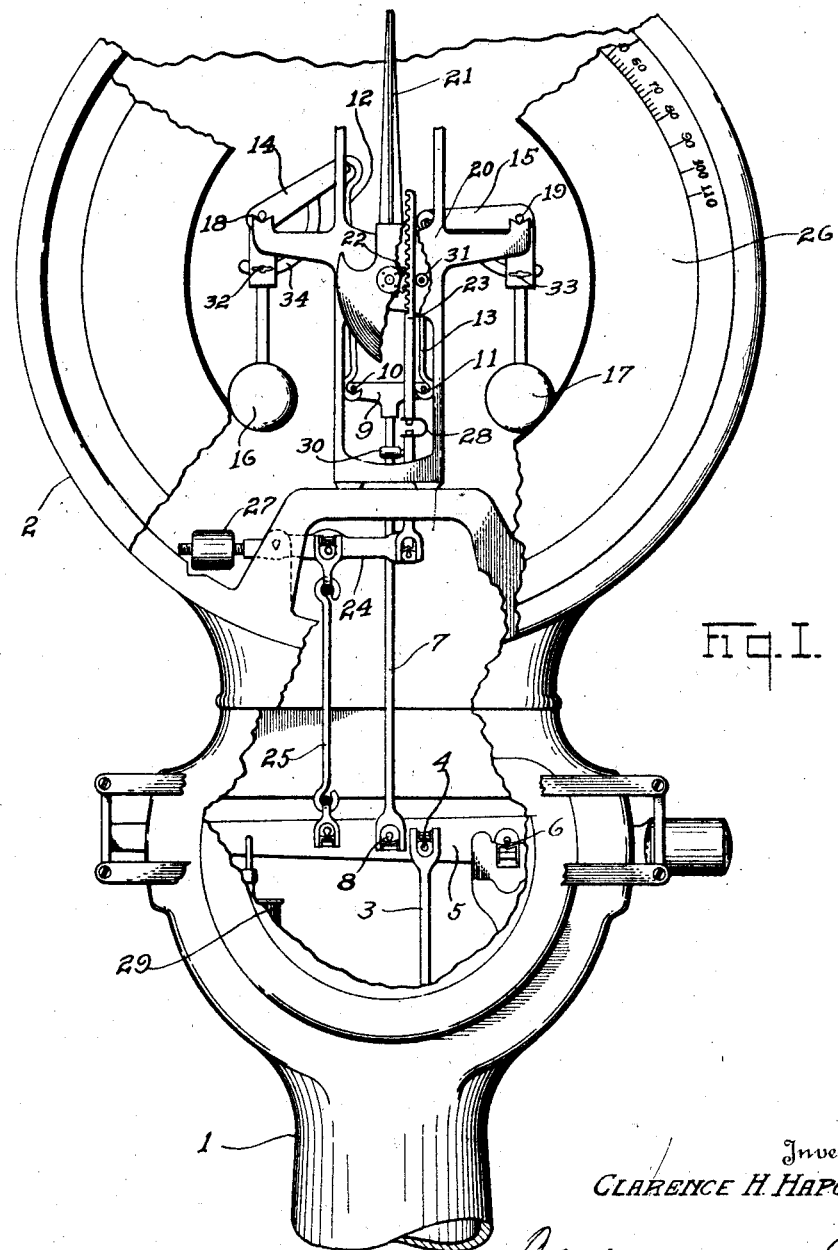
Fig. I.
Inventor
CLARENCE H. HAPGOOD
By BO Marshall
Attorney Patented Oct. 16, 1923.

1,470,667

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed June 3, 1921. Serial No. 474,812.

*To all whom it may concern:*

Be it known that I, CLARENCE H. HAPGOOD, a citizen of the United States, residing at Toledo, in the county of Lucas and State of Ohio, have invented certain new and useful Improvements in Weighing Scales, of which the following is a specification.

This invention relates to weighing scales, and particularly to automatic scales of the pendulum type, and its principal object is the provision of automatic load-offsetting mechanism in which all the moving parts are connected by knife edge pivots, the parts being so arranged that movement of the weighing mechanism is substantially proportional to the load upon the scale platform, so that the weighing mechanism may be connected without the intervention of compensating devices with an indicator adapted to co-operate with a chart having equally spaced graduations.

Another object is the provision of a scale having weighing mechanism of this type which is not so affected when the scale is tipped out of level as to cause an error in the indication.

Other objects and advantages will be apparent from the following description, in which reference is had to the accompanying drawings illustrating a preferred embodiment of my invention and wherein similar reference numerals designate similar parts throughout the several views.

In the drawings:—

The figure is a front elevation showing portions of the weighing and indicating mechanisms of an automatic pendulum scale embodying my invention.

The weighing and indicating mechanisms in the embodiment shown are supported by a hollow column 1 which is surmounted by a substantially watch-casing-shaped housing 2. The steelyard rod 3 of the scale extends vertically through the column 1, its lower end being connected to the platform levers (not shown) of the scale, while its upper end is connected by means of a knife edge pivot 4 to a tare beam lever 5 which is fulcrumed at 6 in the upper end of the column 1.

Extending upwardly from the tare beam lever 5 is a tension rod 7, the lower end of which is connected by means of a knife edge pivot 8 to the tare beam lever, while the upper end terminates in a cross head 9 which is provided with knife edge pivots 10 and 11. Connected respectively to the knife edge pivots 10 and 11 are the lower ends of links 12 and 13, the upper ends of the links being pivotally connected to the power arms 14 and 15 of oppositely swinging load-offsetting pendulums 16 and 17.

The pendulums 16 and 17 are supported on knife edge pivots 18 and 19 resting in bearings supported by a frame 20 mounted within the housing 2, which also supports a rotatable indicator shaft upon which is fixed the indicator hand 21. Fixed upon the indicator shaft is a pinion 22 which meshes with a rack 23, the lower end of the rack bar being pivotally connected to a lever 24, which in turn is connected by means of a link 25 to the tare beam lever 5.

The housing 2 is provided with a transparent face to display the chart 26 which co-operates with the indicator hand 21. The center of the chart 26 is cut away to display the load-offsetting mechanism.

Since the pendulums 16 and 17 swing oppositely, it is apparent that if the scale be tipped to the right the tendency of the pendulum 16 to swing outwardly will be neutralized by the tendency of the pendulum 17 to swing inwardly. The indicator hand 21 will therefore remain at zero.

When the automatic load-offsetting mechanism of the scale is a single pendulum having a power arm which, like the power arm 14, is above a horizontal position when the scale is at zero, the arcs through which the pendulum swings in offsetting equal increments of load increase in length as the power arm approaches a horizontal position, and when the horizontal position of the power arm has been passed the arcs decrease in length as the arm moves away from horizontal position. The graduations on a chart employed with pendulum mechanism of this kind must, therefore, be unequally spaced or some sort of compensating mechanism must be interposed between the indicating hand and the weighing mechanism.

In the scale of my present invention the relation of the power arm 14 to the pendulum 16 is such that the power arm extends upwardly from the supporting pivot of the pendulum at an angle of about 35° when the scale is at zero, while the power arm 15 is substantially horizontal. If, therefore, the scale is loaded by equal increments, the tendency of the pendulum 16 is to swing through arcs which progressively increase in length as the power arm 14 approaches a horizontal position, while the tendency of the arm 15 is to swing through arcs which progressively decrease in length for the equal increments of load as the arm 16 moves away from horizontal position. The tendency of the arcs of movement of the pendulum 16 to increase is thus substantially neutralized by the tendency of the arcs of movement of the pendulum 17 to decrease, and vice versa, so that both pendulums swing through substantially equal arcs for equal increments of load.

Since the movement of the levers 5 and 24, and consequently the movement of the rack 23 and indicator hand 21, is proportional to the movement of the pendulums 16 and 17, the graduations on the chart may be equally spaced. The end of the lever 24 which extends beyond the fulcrum pivot is weighted, as at 27, to overbalance the weight of the rack 23, lever 24 and link 25, so that the link 25 is always under sufficient tension to hold the pivots and bearings at its ends in proper relation.

A shock absorbing leaf spring 28 is interposed in the rack bar 23 to prevent injury to the teeth of the rack and pinion by sudden shocks due to heavy loads being thrown on the platform, and such shocks are further absorbed by a dash pot 29 of the type commonly employed in automatic weighing scales which is connected to the tare beam lever 5.

A small weight 30 serves to lightly hold the rack in mesh with the pinion and a guard roller 31, which is ordinarily out of contact with the rack, serves to prevent the rack from coming entirely out of mesh when the scale is tipped sidewise.

The power arms 14 and 15 are pivotally attached to their respective pendulums and the angles between the arms and their respective pendulum stems may be adjusted by loosening the thumb screws 32 and 33, which when turned up engage the arcuate bars 34 and 35.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a load-offsetting pendulum tending to swing through increasing arcs in offsetting equal increments of load, a load-offsetting pendulum tending to swing through decreasing arcs in offsetting equal increments of load, and means for causing said pendulums to move to substantially the same extent in offsetting a load.

2. In a weighing scale, in combination, a pair of oppositely swinging load-offsetting pendulums, one of said pendulums tending to swing through increasing arcs in offsetting equal increments of load, the other of said pendulums tending to swing through decreasing arcs in offsetting equal increments of load, and means connecting said pendulums to cause them to swing to substantially the same extent.

3. In a weighing scale, in combination, a load-offsetting pendulum tending to swing through increasing arcs in offsetting equal increments of load, a load-offsetting pendulum tending to swing through decreasing arcs in offsetting equal increments of load, means for causing said pendulums to move to substantially the same extent in offsetting a load, and indicating means, including a chart in operative relation to said pendulums.

4. In a weighing scale, in combination, a pair of pendulums having power arms extending at different angles from a horizontal plane, and means connecting said pendulums to cause them to move through substantially equal arcs in offsetting a load.

5. In a weighing scale, in combination, a pendulum having a power arm extending upwardly from its pivot at zero position, a pendulum having a power arm extending substantially horizontally at zero position, and means connecting said pendulums to move them through substantially equal arcs in offsetting a load.

6. In a device of the class described, in combination, a pair of oppositely swinging pendulums, one of said pendulums having a power arm extending at a substantial angle from the horizontal at zero position, the other pendulum having a power arm which is substantially horizontal at zero position, links connected to said power arms, a lever connected to said links, and an indicator operatively connected to said lever.

7. In a weighing scale, in combination, a pair of pendulums, one of said pendulums tending to swing through increasing arcs, and the other of said pendulums tending to swing through decreasing arcs, a lever, means connecting said pendulum to said lever, an indicator, and means connecting said lever to said indicator.

8. In a weighing scale, in combination, a pair of pendulums, one of said pendulums tending to swing through increasing arcs, and the other of said pendulums tending to swing through decreasing arcs, a lever, means connecting said pendulums to said lever, an indicator, a chart having equally spaced graduations co-operating with said indicator, and means connecting said lever to said indicator.

CLARENCE H. HAPGOOD.

Witnesses:
FRANCES DOYLE,
HARRY ERNSBERGER.